US008065463B2

(12) United States Patent  (10) Patent No.: US 8,065,463 B2
Porath et al. (45) Date of Patent: Nov. 22, 2011

(54) MULTI-PURPOSE FLIGHT ATTENDANT PANEL

(75) Inventors: Roland Porath, Hamburg (DE); Kirsten Kopitzke, Hamburg (DE); Hartmut Hintze, Schwarzenbek (DE)

(73) Assignee: Airbus Deutschland GmbH (DE)

( * ) Notice: Subject to any disclaimer, the term of this patent is extended or adjusted under 35 U.S.C. 154(b) by 261 days.

(21) Appl. No.: 12/287,387

(22) Filed: Oct. 8, 2008

(65) Prior Publication Data

US 2009/0119431 A1   May 7, 2009

Related U.S. Application Data

(60) Provisional application No. 60/998,288, filed on Oct. 10, 2007.

(30) Foreign Application Priority Data

Oct. 10, 2007   (DE) .................. 10 2007 048 579

(51) Int. Cl.
  *G06F 13/00* (2006.01)
  *G06F 13/38* (2006.01)
  *G06F 17/00* (2006.01)
  *G06F 15/16* (2006.01)
  *G06F 15/17* (2006.01)
(52) U.S. Cl. ............ 710/316; 710/73; 726/11; 726/27; 709/208; 709/217; 709/225; 709/229; 701/36
(58) Field of Classification Search .............. 710/1, 2, 710/8, 38, 62, 73, 106, 305, 316; 726/11, 726/27; 709/208, 209, 217, 219, 225, 229
See application file for complete search history.

(56) References Cited

U.S. PATENT DOCUMENTS

| 4,584,603 | A | * | 4/1986 | Harrison ........................ 725/76 |
| 5,703,562 | A | * | 12/1997 | Nilsen ..................... 340/286.02 |
| 6,272,601 | B1 | * | 8/2001 | Nunez et al. .................. 711/140 |
| 6,378,009 | B1 | * | 4/2002 | Pinkston et al. ............... 710/62 |
| 7,675,867 | B1 | * | 3/2010 | Mraz et al. .................... 370/254 |
| 2001/0044843 | A1 |  | 11/2001 | Bates et al. |
| 2002/0015063 | A1 | * | 2/2002 | Kopitzke et al. ............. 345/810 |

(Continued)

FOREIGN PATENT DOCUMENTS

DE  10325258 T  1/2005

(Continued)

OTHER PUBLICATIONS

Dardik, Avi. "A Guide to Building a Software KVM Switch". AviDardik.com. Online Mar. 28, 2006. Retrieved from Internet Sep. 16, 2010. <http://www.avidardik.com/2006/03/28/1-guide-to-building-a-software-kvm-switch/>.*

(Continued)

*Primary Examiner* — Thomas J Cleary
(74) *Attorney, Agent, or Firm* — Lerner, David, Littenberg, Krumholz & Mentlik, LLP (57) ABSTRACT

A flight attendant panel, in which a plurality of computer units can be coupled to a common input/output device by a circuitry. One of the computer units is designated as the master computer unit and controls the circuitry in order to specify which of the computer units should be coupled to the input/output device. The actuation of a switch makes it possible to once again return the flight attendant panel into an original state, in which the master computer unit is coupled to the input/output device by the circuitry.

7 Claims, 5 Drawing Sheets

U.S. PATENT DOCUMENTS

| | | | |
|---|---|---|---|
| 2002/0038334 A1* | 3/2002 | Schneider et al. | 709/203 |
| 2003/0182404 A1 | 9/2003 | Saint-Etienne et al. | |
| 2004/0042547 A1* | 3/2004 | Coleman | 375/240.01 |
| 2004/0186634 A1* | 9/2004 | Lucky et al. | 701/3 |
| 2004/0249521 A1 | 12/2004 | Petersen et al. | |
| 2005/0267931 A1* | 12/2005 | Chen et al. | 709/201 |
| 2007/0061847 A1* | 3/2007 | Callahan et al. | 725/76 |
| 2008/0098307 A1* | 4/2008 | Corbefin | 715/733 |
| 2008/0126627 A1* | 5/2008 | Chandrasekhar et al. | 710/62 |

FOREIGN PATENT DOCUMENTS

| | | |
|---|---|---|
| DE | 60305998 T | 1/2007 |
| DE | 69834266 T | 1/2007 |
| JP | 2002-297531 | 10/2002 |

OTHER PUBLICATIONS 2005 4D Engineering GmbH; Airbus Cabin Management System CIDS.

* cited by examiner

MULTI-PURPOSE FLIGHT ATTENDANT PANEL

CROSS-REFERENCE TO RELATED APPLICATIONS

This application claims the benefit of the filing date of U.S. Provisional Patent Application No. 60/998,288 filed Oct. 10, 2007, the disclosure of which is hereby incorporated herein by reference.

The present invention relates to a flight attendant panel (FAP) that is able to manage a multitude of applications, wherein the applications can meet various data integrity requirements. The invention furthermore relates to an aircraft equipped with such a flight attendant panel.

Flight attendant panels can be used in aircraft in order to process various types of data for flight attendants and making the processed data available in a visually or acoustically perceivable fashion, for example, by means of an output device. The flight attendant panel may also feature an input device in order to enable a flight attendant to modify the data. The data may consist of so-called avionics data that contains information on the aircraft itself, for example, with respect to a cabin temperature control, heater adjustments and light adjustments. However, the data may also contain airline-related information such as, for example, a log or passenger-related information, for example, in order to control a range of entertainment options for the passengers.

In order to manage these different types of data, conventional flight attendant panels are usually provided with one or more computer unit(s) that is/are connected to an input and/or output device. For example, applications for illustrating and for modifying avionics data may be implemented on a first computer unit, for example, in order to enable a flight attendant to control corresponding functions of the aircraft. Applications for displaying and for modifying airline data may be implemented on a second computer unit, for example, in order to thusly keep a log. On a third computer unit, for example, functions of a passenger entertainment system can be displayed and modified, for example, in order to specify which entertainment programs should be made available to individual passengers.

In conventional flight attendant panels, the computer unit or the computer units is/are usually connected to a single output device such as, for example, a monitor and to a single input device such as, for example, a keyboard or a mouse. A touch-sensitive monitor ("touchscreen") can advantageously fulfill the function of the output device, as well as the function of the input device. Each of the applications implemented on a computer unit utilizes this one input device and this one output device for inputting and outputting data.

If applications are implemented on different computer units, one of the computer units is designated as the master computer unit or so-called master in conventional flight attendant panels. This master computer unit controls the input and/or output device and features, for example, an image processing device and corresponding video memory ("Video Memory") for this purpose. The other slave computer units (slaves) are controlled by the master computer unit and communicate therewith in order to input and output data.

Due to the direct transmission of data from a slave computer unit to a master computer unit, it might be possible to manipulate the master computer unit in an undesirable fashion with this transmitted data. The risk of an accidental or intentional manipulation of the master computer unit applies, in particular, to future long-range aircraft, in which a slave computer unit manages entertainment applications for the passengers and makes it possible for the passengers to input information and data into the slave computer unit. However, since the master computer unit may process, among other things, avionics data that can related to the safety of the aircraft, the possibility of such a manipulation must be prevented in the best possible fashion.

Consequently, there may be a need for a flight attendant panel, in which several applications can be implemented and in which certain applications are reliably protected against manipulation. There may furthermore be a demand for an aircraft equipped with such a flight attendant panel.

This need may be met with the subject of the independent claims. Advantageous additional developments and embodiments of the invention are disclosed in the dependent claims.

According to a first aspect of the invention, a flight attendant panel is provided that features at least the following components: a multitude of computer units with a master computer unit and at least one slave computer unit; an input/output device; a circuitry; and at least one switch. Each of the multitude of computer units is able to operate autonomously and designed for executing at least one application specifically assigned thereto. The circuitry is controlled by the master computer unit and designed for connecting the input/output device to the multitude of computer units based on a selection signal received from the master computer unit. Therein, the flight attendant panel is designed in such a way that the circuitry connects the input/output device to the master computer unit when the switch is actuated.

Expressed descriptively, the invention according to the first aspect can be considered to be based on the following ideas. The flight attendant panel features several computer units, each of which can operate autonomously. This means that each computer unit, namely either a master or a slave, is able, for example, to process data to be visualized independently with the aid of its own image processing device and its own video memory such that it can be output on a monitor. In addition, each computer unit is able, for example, to receive and independently process input data from an input device. In other words, each of the computer units can be used independently of the other computer units as soon as it is connected to an input and/or output device and a user such as, for example, a flight attendant can use this computer unit and the applications implemented thereon with the aid of the input and/or output device connected thereto.

In order to prevent that each of the computer units requires its own corresponding input/output device, one common input/output device is provided for the multitude of computer units. The input/output device may consist of several individual instruments, for example, a device for the input of data by a user such as, e.g., a keyboard, a mouse, a touchpad, a microphone, etc., and a device for the visual or aural output of data such as, e.g., a monitor, a projector, a loudspeaker, etc. Alternatively, individual functions of the input/output device may also be combined in a single instrument such as, e.g., a touch-sensitive monitor (touchscreen).

A circuitry is provided which is able to directly connect each of the computer units to the input/output device, wherein it is preferred that only a single computer unit is connected to the input/output device at any given time. One specific computer unit of the multitude of computer units is designated as the master computer unit and controls the circuitry. Based on a selection signal such as, e.g., a signal, by means of which a user selects which applications implemented on the different computer units he would like to execute or control, the master computer unit can prompt the circuitry to connect the input/output device to the respective computer unit responsible for the selected application. Beginning at the time this connection is produced, the input/output device communicates only with the selected computer unit, wherein the master computer unit is able, however, to interrupt this connection at any time, for example, in order to output a warning message such as, e.g., a smoke warning on the input/output device.

A user could only input data such as, e.g., the selection signal into the master computer unit with the aid of the input/output device as long as the master computer itself is connected to the input/output device, wherein said selection signal would prompt the master computer to instruct the circuitry to connect the input/output device to a different computer unit. However, as soon as the connection is switched over from the master computer unit to one of the slave computer units, it is no longer possible to input data into the master computer unit with the aid of the input/output device. Consequently, an additional switch is provided in order to prompt the circuitry to reestablish the connection between the input/output device and the master computer unit, wherein said switch is directly connected to the master computer unit and, when actuated, prompts the master computer unit to instruct the circuitry to once again produce the connection between the input/output device and the master computer unit. Alternatively, the switch may also be directly connected to the circuitry, wherein an actuation of the switch directly prompts the circuitry to connect the input/output device to the master computer unit in this case.

On one hand, the present invention enables several different computer units to utilize one common input/output device, wherein different applications may be implemented on each of the computer units and each of the computer units may be integrated into a different network. On the other hand, a flight attendant panel according to the present invention makes it possible to ensure that no data whatsoever can be transmitted from one of the slave computer units to the master computer unit such that a manipulation of safety-critical applications implemented on the master computer unit is precluded. Each of the slave computer units can operate autonomously and independently of the other computer units. The input/output device serves exclusively for inputting and outputting data into and from the respective computer unit connected thereto, but preferably does not have its own data processing and storage capacities. Due to the fact, in particular, that only the master computer unit and the switch to be externally actuated by a flight attendant are able to prompt the circuitry to produce a connection between the input/output device and one of the computer units, it is possible to prevent, for example, that data input into or processed in one of the slave computer units can be used for manipulating the entire flight attendant panel and for influencing, in particular, safety-relevant applications implemented on the master computer unit.

Characteristics, properties, advantages and alternative embodiments of the invention are described below.

The flight attendant panel may feature two or more computer units (computers). In this case, only one of the computer units is designated as the master computer unit or so-called master, i.e., it has certain special privileges that other computer units do not have. For example, the master computer unit according to one special embodiment of the flight attendant panel can send data or signals to the slave computer units, wherein the slave computer units conversely cannot send any data to the master computer unit. In addition, the master computer unit can control the circuitry, i.e., it can prompt the circuitry to produce a connection between the input/output device and one of the computer units.

Each computer unit, namely either a master or a slave, is able to operate autonomously and independently. In other words, each of the computer units may feature its own data processing unit (CPU) and its own data memory, as well as its own image data processing device and corresponding interfaces for inputting and outputting data. As soon as a computer unit is coupled to an input/output device, a user is able to utilize this computer unit in a completely autarkic fashion without requiring a data exchange with any of the other computer units.

The master computer unit is always required for the basic function of the flight attendant panel, particularly in order to control the circuitry, but the flight attendant panel may optionally comprise any number of slave computer units. For example, certain slave computer units may form standard components of the flight attendant panel when an aircraft is delivered while other slave computer units can be optionally added, for example, in order to run applications thereon which correspond to special intended uses of an aircraft or special requirements of an airline.

The input/output device is preferably realized in the form of a touchscreen such that it can be simultaneously used for the visual output of data, as well as for the input of data or commands by a user. For example, different symbols that should represent different applications can be displayed for the user on the touchscreen and the user can select the application to be executed by pressing a finger on the corresponding symbol displayed on the touchscreen. A particularly user-friendly operation of the flight attendant panel can be realized in this fashion. Alternatively, the input/output device may, however, also feature several separate instruments such as, for example, a monitor for outputting data and a keyboard and/or a mouse for inputting data.

The circuitry may be realized in the form of a software-controlled circuit. In other words, the circuitry can receive electrical signals by means of a signal input and produce an electrical connection between the input/output device on one hand and one of the computer units on the other hand based on these signals. The allocation of the input/output device to one of the computer units preferably is uniquely defined in this case.

Only the master computer unit is connected to the signal input of the circuitry and authorized to control the circuitry. To this end, the master computer unit may generate a selection signal, for example, based on a corresponding input by a user on the input/output device, and forward this selection signal to the signal input of the circuitry. Based on this selection signal, the circuitry then switches an electrical connection between the input/output device and the computer unit that corresponds to the selection signal.

As soon as the circuitry has interrupted the original connection between the input/output device and the master computer unit and instead established a connection between the input/output device and one of the slave computer units, the user is no longer able to use the input/output device for prompting the master computer unit to instruct the circuitry to produce a connection between the input/output device and the master computer unit or another slave computer unit. Consequently, a separate switch is provided on the flight attendant panel in addition to the input/output device, wherein the actuation of this switch prompts the circuitry to reestablish the connection between the input/output device and the master computer unit. In this case, the switch may be designed in any suitable fashion, for example, in the form of a mechanical key button, the actuation of which results in the generation of an electrical signal that is either directly forwarded to the signal input of the circuitry or to the master computer unit and prompts the master computer to instruct the circuitry to once again produce a connection between the input/output device and the master computer unit.

According to one embodiment of the present invention, the master computer unit is designed for managing an application menu and, when a specific application is selected by a user, for prompting the corresponding computer unit to execute the specifically assigned application, as well as for prompting the circuitry to connect the corresponding computer unit to the input/output device.

In other words, the master computer unit may be designed for keeping a list of all applications, i.e., application software, that can be executed thereon and on the slave computer units. This list can be displayed on the input/output device, for example, in the form of graphic symbols, and provides the user with an application menu. The user can select one specific application from this application menu, for example, by clicking on the corresponding applications symbol on a touchscreen of the input/output device. The master computer unit is able to register this selection and to subsequently determine the computer units, on which the selected application is implemented, based on the available application list. The master computer unit can then generate a selection signal based on this information and transmit this selection signal to the circuitry in order to prompt the circuitry to connect the input/output device to the corresponding computer unit. The master computer unit also may simultaneously or subsequently prompt the corresponding computer unit to execute the application selected by the user such that the user has the option of displaying the desired data on the input/output device and modifying the desired data.

The provision of an application menu significantly simplifies the operation of the flight attendant panel for a user. The user does not have to know which of the computer units can execute a desired application and the user accordingly does not have to know which of the computer units should be connected to the input/output device by means of the circuitry. Instead, the user merely needs to select the desired application from the application menu and the flight attendant panel then automatically determines the computer unit to be connected to the input/output device by means of the circuitry and subsequently executes the application.

According to another embodiment, the master computer unit is connected to the at least one slave computer unit by means of a unidirectional signal line in order to transmit signals from the master computer unit to the slave computer unit.

The unidirectionality of the signal line, i.e., the ability to transmit electrical signals in only one direction from the master computer unit to the slave computer unit, but not in the opposite direction, may be achieved, for example, in that a signal line port on the master computer unit is only able to transmit signals and a signal line port on the slave computer unit is only able to receive signals. This makes it possible to ensure that no data whatsoever can be transmitted from a slave computer unit to the master computer unit. Consequently, an undesirable manipulation of the master computer unit by means of one of the slave computer units can be precluded. However, the master computer unit can definitely send data to one of the slave computer units. This data may simply serve as a signal in order to prompt one of the slave computer units to execute a certain application; however, the data may also contain information that can be made available to an application implemented on one of the slave computer units.

Consequently, the protection against an undesirable manipulation of safety-relevant applications implemented on the master computer unit, as well as the user-friendliness, is promoted due to the data transmission from the master computer unit to one of the slave computer units.

According to another embodiment of the present invention, the flight attendant panel features only one housing, wherein all components of the flight attendant panel are accommodated in this housing.

In other words, the entire flight attendant panel may form one unit that is enclosed by a common housing. The input/output device, as well as the at least one switch, is accessible from outside in this case and arranged on the housing such that it can be actuated by a user. The other components such as, for example, the computer unit and the circuitry may be accommodated in the interior of the housing. The flight attendant panel therefore may be realized in the form of an independent unit that merely needs to be coupled to the remainder of the aircraft infrastructure by means of power connections and data interfaces. Such a flight attendant panel therefore can be easily installed and removed, serviced and replaced in case of a defect. In this case, the dimensions of the housing may be adapted to the space that is usually available for a flight attendant panel in an aircraft, for example, approximately 40 cm×40 cm×8 cm.

The characteristics described above with reference to individual embodiments of the present invention can be combined with one another in different ways.

The above-described and other characteristics, aspects and advantages of the present invention are elucidated in the following description of specific embodiments and with reference to the enclosed drawings.

BRIEF DESCRIPTION OF THE DRAWINGS

In the figures, identical or similar elements are identified by the same reference symbols in the different embodiments. The figures are illustrated schematically and reflect the proportions in size roughly at best.

Figure 1:
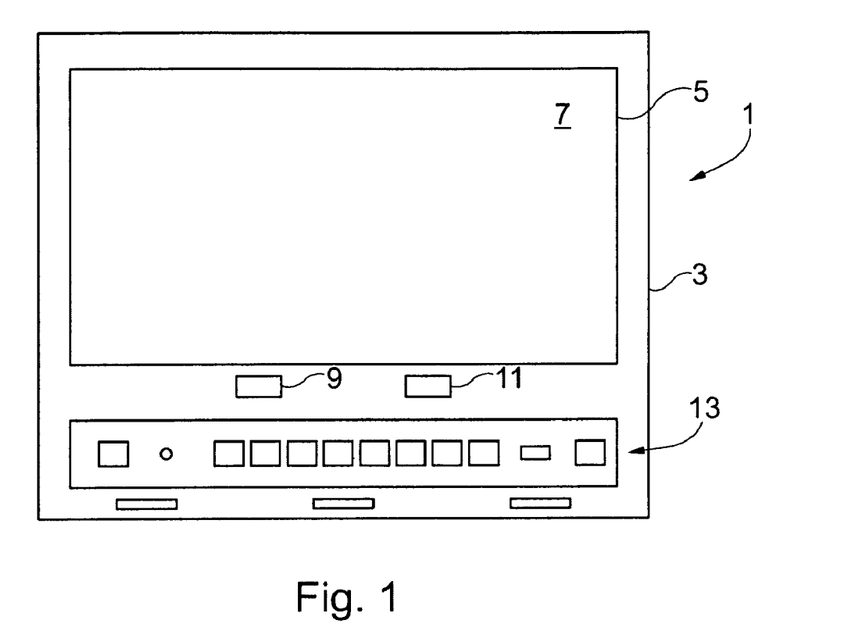
FIG. 1 shows a top view of a flight attendant panel according to one embodiment of the present invention.

FIG. 1 shows a top view of a flight attendant panel 1 according to one embodiment of the present invention. A touchscreen 7 that serves as input/output device 5, two separate switches 9, 11 and a multitude of connections/switches 13 that can be actuated by a user or externally accessed by a user are arranged in a housing 3.

Figure 2:
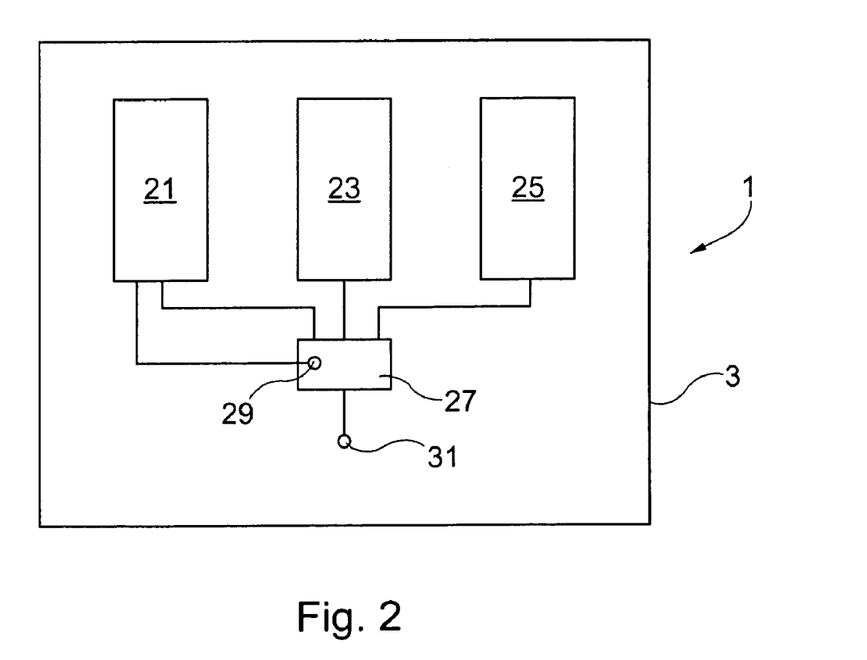
FIG. 2 schematically shows an interior view of the flight attendant panel according to FIG. 1.

FIG. 2 schematically shows the arrangement of components of the flight attendant panel 1 in the interior of the housing 3. Three separate computer units 21, 23, 25 are respectively connected to a circuitry 27. The circuitry 27 can produce an electrical connection between the data interface 31 and one of the computer units 21, 23, 25 depending on the selection signal it receives at a signal input 29 that is connected to a master computer unit 21. The data interface 31 is coupled to the input/output device 5.

Figure 3:
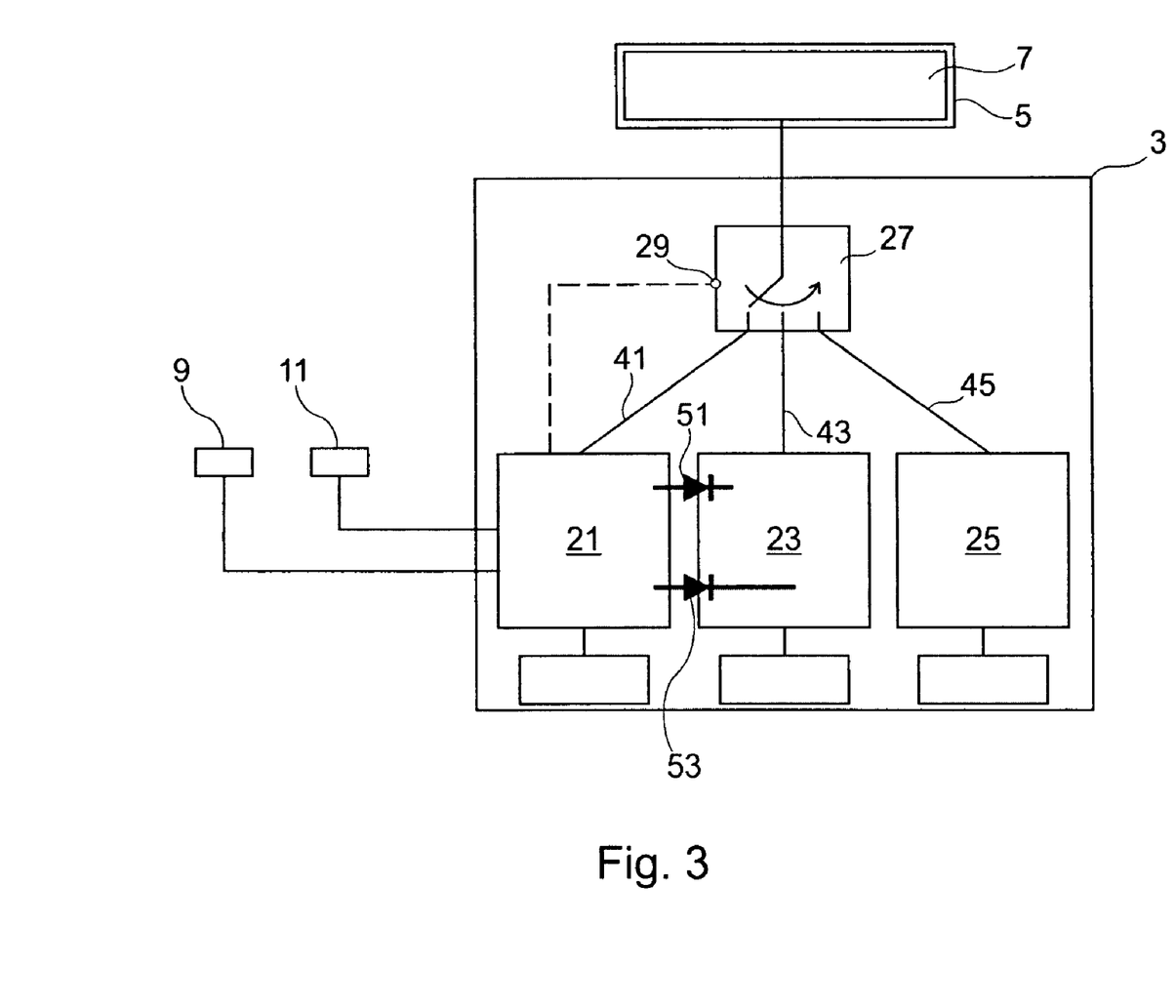
FIG. 3 shows a highly schematic representation of circuit connections between individual components of the flight attendant panel according to FIG. 1.
Figure 4:
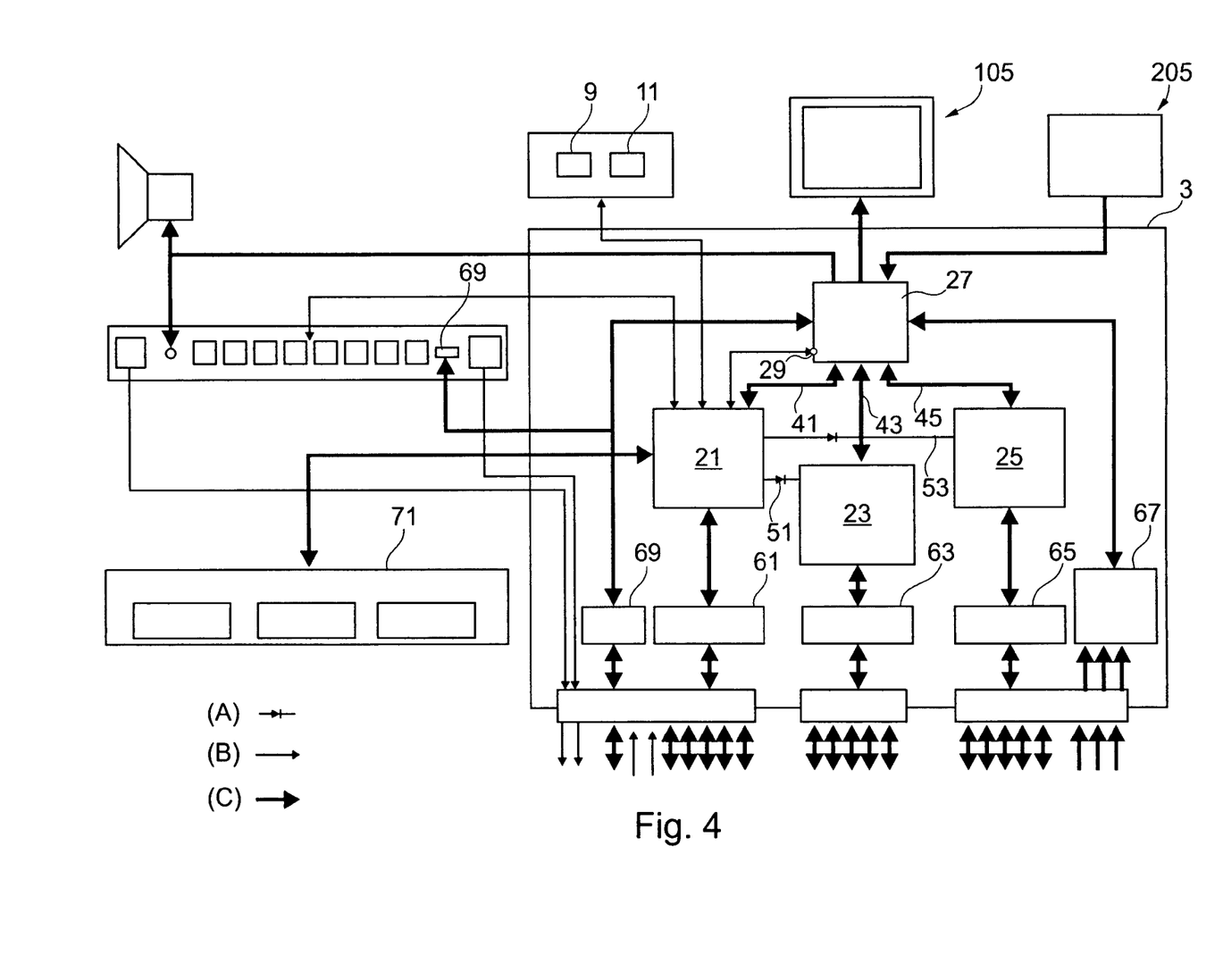
FIG. 4 shows details of circuit connections between components of the flight attendant panel according to FIG. 1.

The circuit connections between the individual components of the flight attendant panel 1 according to FIGS. 1 and 2 are illustrated schematically in FIG. 3 and in greater detail in FIG. 4. The functionality of the individual connections between specific system components is also schematically illustrated, in particular, in FIG. 4. The diode symbol (A) exemplifies a unidirectional connection between two components, on which data can only be transmitted in the direction of the arrow, similar to a diode. The arrow symbol (B) is intended to represent a control function by the master computer unit 21. The bold arrow symbols (C) represent jointly used interfaces.

The three computer units 21, 23, 25 are situated in a common housing 3. They are connected to the circuitry 27 by means of data lines 41, 43, 45. These data lines 41, 43, 45 can transmit, for example, audio data, video data, USB-data and touch data. The circuitry 27 is also connected to the input/output device 5, wherein this input/output device is illustrated in FIG. 3 in the form of a touchscreen 7 for simultaneously displaying and inputting data, and wherein the display function in the form of a monitor 105 is illustrated separately of the input function in the form of a touch panel 205 in FIG. 4. A signal input 29 of the circuitry 27 is connected to the master computer unit 21. This connection enables the master computer unit 21 to instruct the circuitry 27 which of the computer units 21, 23, 25 should be connected to the input/output device 5 by the circuitry.

The external switches 9, 11 are connected to the master computer unit 21. The actuation of the first switch 9 may prompt the master computer unit 21 to send a corresponding signal to the signal input 29 of the circuitry 27 in order to instruct the circuitry to interrupt the connection between the input/output device 5 and one of the slave computer units 23, 25 and to instead establish a connection with the master computer unit 21. The additional switch 11 makes it possible to prompt the master computer unit 21 to display an application menu so as to enable a user to select a desired application with the aid of the input/output device 5.

The master computer unit 21 is respectively connected to the slave computer units 23, 25 by means of a unidirectional connection 51, 53 respectively. These unidirectional connections 51, 53 enable the master computer unit 21, for example, to instruct one of the slave computer units 23, 25 to execute a previously selected application. In addition, these unidirectional connections 51, 53 make it possible to transmit data from the master computer unit 21 to one of the slave computer units 23, 25, but not in the opposite direction.

The three computer units 21, 23, 25 are arranged on a common (not-shown) main board that serves as the backplane. This main board contains the power supply, the circuitry, the video processing, the external connections or ports and interfaces with other circuit boards, the liquid crystal display (LCD) and the touchscreen. The computer units 21, 23, 25 respectively comprise the same standard computer circuit boards, for example, based on an Intel Pentium M.

The master computer unit 21 represents the master and controls the other computer units 23, 25. A communication is only possible from the master computer unit 21 to the slave computer units 23, 25 by means of the unidirectional connections 51, 53. The unidirectional connection can be realized, for example, by means of the RS232-Tx-only connection that is described in greater detail farther below.

The master computer unit 21 can bypass the switches 9, 11 that are also referred to as "domain keys" in case of an important event ("autoevent"), for example a smoke warning, such that an important notification can always be immediately displayed on the input/output device 5. If the master computer unit 21 needs to output an important notification while the input/output device is still connected to one of the slave computer units 23, 25, the master computer unit consequently can force the circuitry 27 to produce the connection of itself with the input/output device 5. Alternatively, the switches 9, 11 may be illuminated and the master computer unit 21 may prompt one or both of the switches to blink in case of an urgent notification.

In order to communicate with external networks, each of the computer units 21, 23, 25 is connected to its own Ethernet interface 61, 63, 65. Furthermore, an additional input for analog audio/video signals 67 may also be provided. It would also be possible to provide a loudspeaker/analog headset connection and a USB connection 69, e.g., in order to transfer externally stored data into the flight attendant panel. In addition, a flash memory card reader 71 may be connected to the master computer unit 21 in order to read in external data.

The individual electrical and functional connections between the aforementioned components of the flight attendant panel may be realized as illustrated in FIG. 4.

Figure 5:
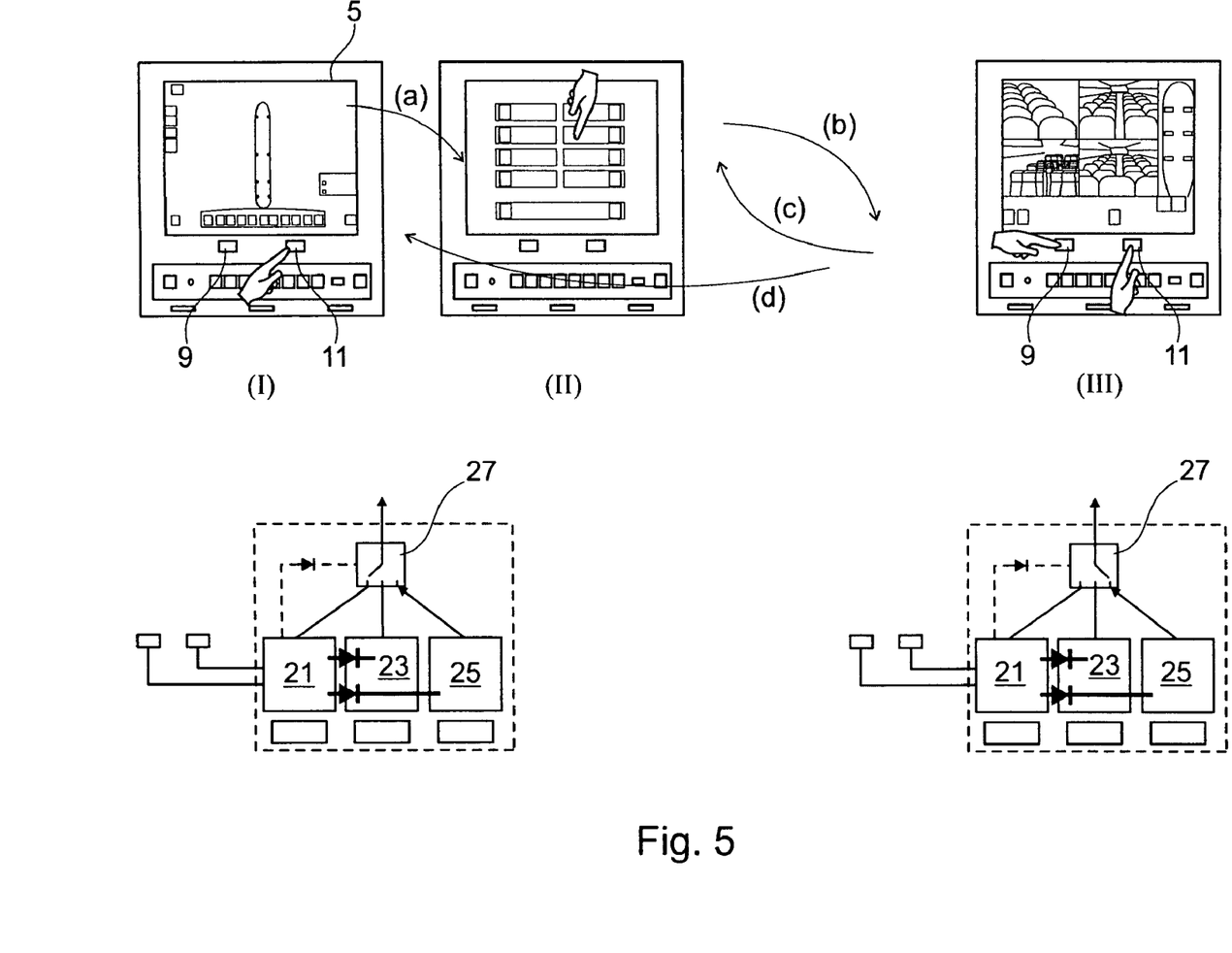
FIG. 5 shows possible functions of the flight attendant panel according to FIG. 1.

The operation of the flight attendant panel is described below with reference to FIG. 5. In this case, the top illustrations in FIG. 5 respectively show a current screen content while the lower illustrations schematically indicate the corresponding setting, in particular, with respect to the circuitry 27.

In a basic state (I), the master computer unit 21 is connected to the input/output device 5 and aircraft-specific data is displayed on the monitor. It would be possible, for example, to display a schematic aircraft fuselage with its individual sections such that a flight attendant can retrieve certain measured values determined by means of sensors, for example with respect to the temperature in the individual aircraft sections, by touching specific symbols. The flight attendant is also able to purposefully modify the corresponding parameters. Since the data that can be displayed and modified in this state may influence the safety and the function of the aircraft and of the passengers, it needs to be ensured that only authorized flight attendants have access to safety-critical data.

When the menu key 11 is pressed, the system is switched into a second state (II) (see arrow (a)), in which a menu with the available applications is displayed. A user is able to select the application to be executed next from this menu by pressing the corresponding symbol on the touchscreen. The master computer unit 21 recognizes this selection and determines which of the computer units 21, 23, 25 is able to execute the corresponding application. Subsequently, the master computer unit prompts the circuitry 27 to connect the corresponding computer unit 21, 23, 25 to the input/output device 5.

If the selected application can be executed, for example, on the slave computer unit 25, this computer unit 25 is connected to the input/output device 5. In this case, the flight attendant panel is in a state (III) (see arrow (b)). In this state, it is possible, for example, to display video monitoring of the aircraft cabin on the monitor of the flight attendant panel or the entertainment programs to be made available to the passengers can be selected. The slave computer unit 25 may be connected to a network that is also accessible to the passengers. However, since no data whatsoever can be transmitted from the slave computer unit 25 to the master computer unit 21, it is ensured that the passengers cannot accidentally or intentionally manipulate safety-relevant applications implemented on the master computer unit 21.

In order to once again exit the state (III), a flight attendant can either actuate the button 9 on the flight attendant panel 1 in order to thusly return to the basic state (I) (see arrow (d)) or actuate the menu button 11 in order to return to the state (II)

(see arrow (c)), in which the application menu is displayed. In both instances, the master computer unit 21 connected to the two buttons 9, 11 instructs the circuitry 27 to reestablish the connection between the master computer unit 21 and the input/output device 5.

The functionality of the unidirectional connections 51, 53 is briefly described below with reference to FIG. 6. All computer units 21, 23, 25 feature a RS232 interface. The RS232 interface is a serial interface, particularly a two-wire bit serial interface that, in principle, can be operated bidirectionally, wherein a data input Rx and a data output Tx are provided. Data can be transmitted with a transfer rate up to 20 kbps.

Figure 6:
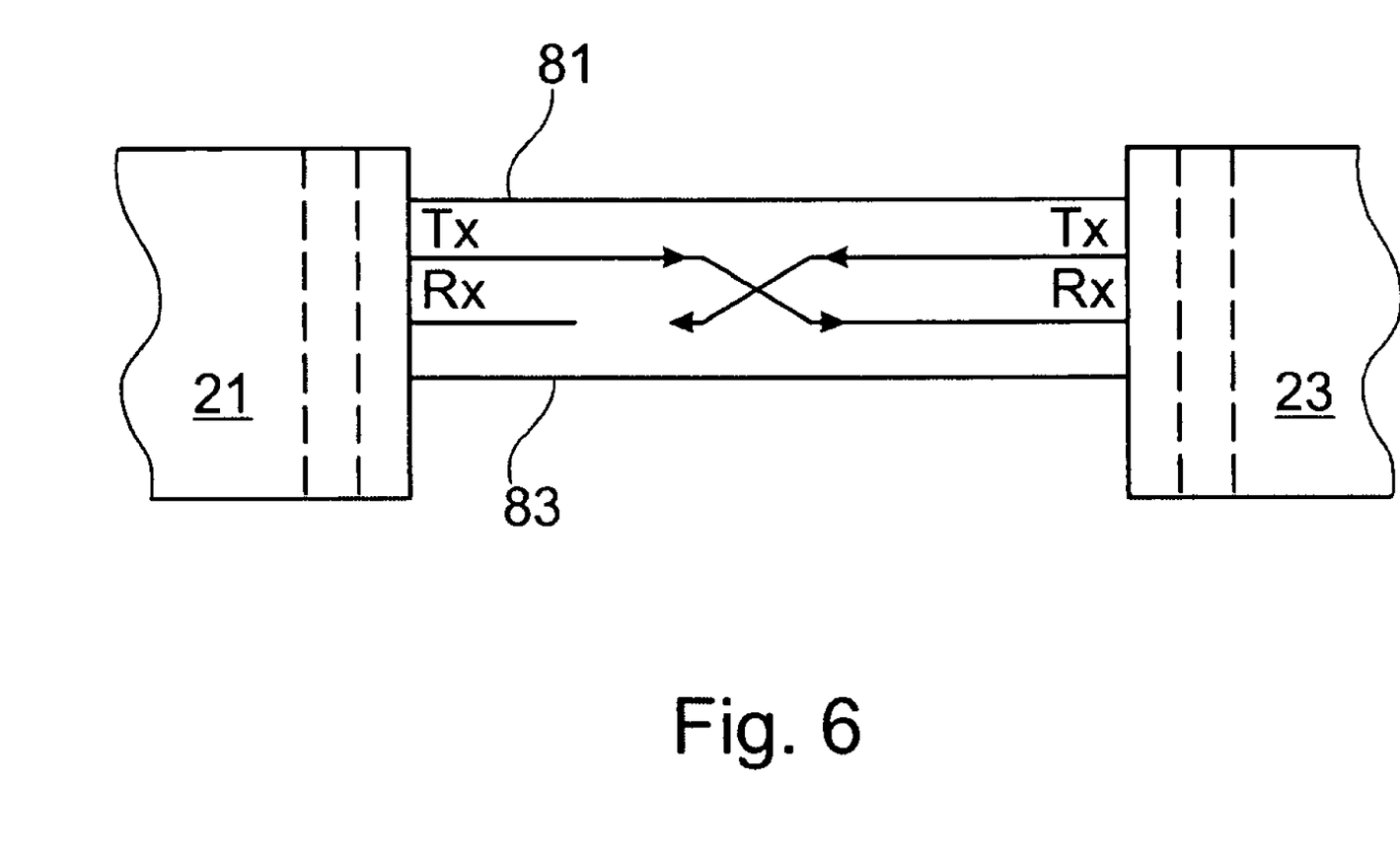
FIG. 6 schematically shows the realization of a unidirectional connection for use in a flight attendant panel according to an embodiment of the present invention.

In order to utilize such a RS232 interface for producing a unidirectional connection between a master computer unit 21 and, e.g., a slave computer unit 23, the two interfaces provided on the computer units 21, 23 may be wired as shown in FIG. 6. The data output connection Tx of the interface provided on the master computer unit 21 is connected to the data input connection Rx of the interface provided on the slave computer unit 23. This connection makes it possible to transmit data from the master computer unit 21 to the slave computer unit 23. However, the opposite connection from the data output connection of the interface provided on the slave computer unit 23 to the data input connection of the interface provided on the master computer unit 21 is interrupted. This ensures that no data can be transmitted from the slave computer unit 23 to the master computer unit 21. In addition, a housing grounding line 81 and a signal grounding line 83 are realized between the two computer units 21, 23.

In conclusion, a few essential characteristics of the flight attendant panel according to the embodiment shown are specified once again below: all computer units 21, 23, 25 can operate autonomously. Each computer unit 21, 23, 25 can use the same peripheral devices such as, for example, touchscreen, LCD, USB, audio jack and loudspeaker. A sophisticated hardware control mechanism allocates the touchscreen, LCD, USB and audio information and is controlled by the master computer unit 21. The data separation is realized with the following control mechanisms: the touchscreen serves exclusively for inputting and outputting data and no screen data is stored; each computer unit 21, 23, 25 features its own graphics controller and only the display is changed over between the individual computer units; each computer unit features its own USB controller and only the connecting cables are changed over between the different computer units; each computer unit 21, 23, 25 features its own audio controller and only the connecting cables and audio cables are changed over between the different computer units. Two additional mechanical switches are also integrated into the front side of the flight attendant panel. These switches realize the control mechanism between the graphical user interface (GUI) of the master computer unit 21 and a menu page with soft-keys for network applications. The master computer unit 21 controls the hardware switches for the LCD, etc., and decides which page should be displayed. A first switch 9 links directly to the graphical user interface of the master computer unit 21 and a second switch 11 links to the menu page. The menu page shows soft-keys for selecting available network applications. The graphical user interface of the master computer unit, the menu page and the corresponding hardware switches on the front cover are controlled exclusively by the master computer unit 21. All available network applications are offered for selection on the menu page, namely regardless of the computer unit 21, 23, 25, on which they are implemented. An allocation of an application to a certain computer unit is not visible for a user. When a network application is selected on the menu page, the respective application is started by completely changing over to the respective computer unit responsible for this application. If the user wants to return to the menu page, the menu switch 11 on the front side of the housing 3 needs to be pressed such that the user is subsequently able to select a different network application. The user needs to press the first switch 9 in order to return to the graphical user interface of the master computer unit 21.

In conclusion, it is pointed out that the terms "comprising," "featuring," etc., do not preclude the presence of other elements. The term "a" also does not preclude the presence of a multitude of objects. The reference symbols in the claims merely serve for improving the readability and are not intended to restrict the scope of protection of the claims in any way.

The invention claimed is:
1. A flight attendant panel comprising:
a plurality of computer units comprising a master computer unit and at least one slave computer unit;
an input/output device enabling data input/output to a computer unit;
a circuitry; and
at least one additional switch for providing a prompting signal upon actuation;
wherein each of the plurality of computer units is able to operate independently of one another and adapted for executing at least one application specifically assigned thereto, such that no data is transmitted from the at least one slave computer unit to the master computer unit;
wherein the circuitry is controlled only by the master computer unit for connecting the input/output device to only one of the plurality of computer units at any given time based on a selection signal received from the master computer unit; and
wherein the circuitry connects the input/output device to the master computer unit when the switch is actuated.
2. The flight attendant panel of claim 1,
wherein the master computer unit is adapted for managing an application menu and, when a specific application is selected by a user, for prompting the corresponding computer unit to execute the specifically assigned application, as well as for prompting the circuitry to connect the corresponding computer unit to the input/output device.
3. The flight attendant panel of claim 1,
wherein the input/output device comprises at least one device from the group comprising of a monitor, an input device for the input of data by a user and a data interface for exchanging data with external devices.
4. The flight attendant panel of claim 3,
wherein the input/output device comprises a touchscreen.
5. The flight attendant panel of claim 1,
wherein the master computer unit is connected to the at least one slave computer unit by an unidirectional signal line in order to transmit signals from the master computer unit to the slave computer unit.
6. The flight attendant panel of claim 1, further comprising a housing,
wherein all components of the flight attendant panel are accommodated in the housing.
7. An aircraft comprising:
a flight attendant panel comprising:
a plurality of computer units comprising a master computer unit and at least one slave computer unit;
an input/output device enabling data input/output to a computer unit;
a circuitry; and at least one additional switch for providing a prompting signal upon actuation;

wherein each of the plurality of computer units is able to operate independently of one another and adapted for executing at least one application specifically assigned thereto, such that no data is transmitted from the at least one slave computer unit to the master computer unit;

wherein the circuitry is controlled only by the master computer unit for connecting the input/output device to only one of the plurality of computer units at any given time based on a selection signal received from the master computer unit; and wherein the circuitry connects the input/output device to the master computer unit when the switch is actuated.

* * * * *